United States Patent
Chen et al.

(10) Patent No.: US 9,588,281 B2
(45) Date of Patent: Mar. 7, 2017

(54) SNAP-FIT FOR FIXING OPTICAL FILM, AND BACKLIGHT MODULE AND LIQUID CRYSTAL DISPLAY WITH THE SAME

(71) Applicant: Shenzhen China Star Optoeletronics Technology Co., Ltd., Shenzhen, Guangdong (CN)

(72) Inventors: Shihhsiang Chen, Shenzhen (CN); Gang Yu, Shenzhen (CN); Dehua Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 749 days.

(21) Appl. No.: 13/980,921

(22) PCT Filed: Jun. 24, 2013

(86) PCT No.: PCT/CN2013/077781
§ 371 (c)(1),
(2) Date: Jul. 22, 2013

(87) PCT Pub. No.: WO2014/153875
PCT Pub. Date: Oct. 2, 2014

(65) Prior Publication Data
US 2016/0004007 A1    Jan. 7, 2016

(30) Foreign Application Priority Data

Mar. 29, 2013 (CN) .......................... 2013 1 0110077

(51) Int. Cl.
G02F 1/1333 (2006.01)
F21V 8/00 (2006.01)
G02F 1/1335 (2006.01)

(52) U.S. Cl.
CPC ......... G02B 6/0088 (2013.01); G02F 1/1336 (2013.01); G02F 1/133308 (2013.01);
(Continued)

(58) Field of Classification Search
CPC ................................................. G02F 1/133308
(Continued)

(56) References Cited

U.S. PATENT DOCUMENTS

2002/0080298 A1* 6/2002 Fukayama ........ G02F 1/133308
349/58

FOREIGN PATENT DOCUMENTS

CN            101672991 A        3/2010

\* cited by examiner

*Primary Examiner* — Phu Vu
(74) *Attorney, Agent, or Firm* — Andrew C. Cheng

(57) ABSTRACT

A snap-fit for fixing optical films is disclosed. The optical film includes at least one ear hook arranged above a border of a plastic frame. The plastic frame is assembled with a back frame so as to fix a light guiding plate within the back frame. The snap-fit includes a press portion and a connection portion extending from a first side of the press portion. The connection portion and the press portion cooperatively form an angle with a predetermined degree. The press portion presses the ear hook of the optical films on the border of the plastic frame. The connection portion clasps with the hook of the sidewall. By adopting the snap-fit, not only the narrow bezel design can be achieved, but also the optical film can be stably fixed. A backlight module with the above snap-fit and the liquid crystal display are also disclosed.

8 Claims, 3 Drawing Sheets

(52) U.S. Cl.
CPC .. *G02B 6/005* (2013.01); *G02F 2001/133317* (2013.01); *G02F 2201/46* (2013.01); *G02F 2201/54* (2013.01)

(58) Field of Classification Search
USPC .......................................................... 349/58
See application file for complete search history.

SNAP-FIT FOR FIXING OPTICAL FILM, AND BACKLIGHT MODULE AND LIQUID CRYSTAL DISPLAY WITH THE SAME

BACKGROUND OF THE INVENTION

1. Field of the Invention

Embodiments of the present disclosure relate to liquid crystal display technology, and more particularly to snap-fits for fixing optical film, and the backlight module and the liquid crystal display with the same.

2. Discussion of the Related Art

Backlight is one kind of light sources to liquid crystal devices. Generally, direct backlight modules and edge-type backlight modules are provided. The light source of the direct backlight module, such as CCFL or LED, is arranged behind the display panel. The lights from the light source form a surface light source after passing through optical films, such as diffusion plates or prism. The light source of the edge-type backlight module, such as LED light bar, is arranged on lateral sides of the display panel. The lights from the light source enter the light guiding plate to transform the light source to the surface source.

Currently, in order to fix the optical films, one solution is to form ear hooks on edges of the optical films and to arrange positioning pillars on the back plate. The ear hooks engage with the positioning pillars, and the optical films are pressed by a plastic frame. However, the positioning pillars have to be spaced apart from the back plate, and this is detrimental to the narrow bezel design. Another solution is to bond the optical films on the light guiding plate by adhesive tapes. However, such solution is not reliable enough.

SUMMARY

In one aspect, a snap-fit for fixing optical films is disclosed. Each of the optical films comprises at least one ear hook arranged above a border of a plastic frame. The plastic frame is assembled with a back frame so as to fix a light guiding plate within the back frame. The snap-fit includes: a press portion and a connection portion extending from a first side of the press portion, the connection portion and the press portion cooperatively form an angle with a predetermined degree, the press portion presses the ear hook of the optical films on the border of the plastic frame, and the connection portion clasps with the hook of a sidewall of the back frame.

Wherein the predetermined degree of the angle is of a range between 80 and 90 degrees.

Wherein the border of the plastic frame comprises a positioning pillar, the ear hook comprises a positioning hole, a second side of the press portion comprises a semicircle through hole, the connection portion comprises a connecting through hole, the positioning hole and the semicircle through hole engages with the positioning pillar in turn, and the connecting through hole clasps with the hook.

Wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

Wherein the press portion further comprises a third side and a fourth side respectively extending outward to form a first flat portion and a second flat portion, and a recess is formed between the second side and a bottom surface of the press portion.

Wherein the border of the plastic frame further comprises a blind hole, the ear hook comprises a positioning hole, the second side of the press portion comprises a flange, the connection portion comprises a connecting through hole, and wherein the flange passes through the positioning hole and then inserted into the blind hole, and the connecting through hole engages with the hook.

Wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

Wherein the snap-fit is made by metallic material.
Wherein the snap-fit is made by plastic material.

In another aspect, a backlight module, includes: a plurality of optical films, a plastic frame, a light guiding plate, a back frame, and a plurality of snap-fits, the optical films are disposed above the plastic frame, the plastic frame assembled with the back frame so as to fix the light guiding plate within the back frame, the snap-fits press the optical films and clasp with the hooks on a sidewall of the back frame so as to fix the optical film, and the snap-fit comprises a press portion and a connection portion extending from a first side of the press portion, the connection portion and the press portion cooperatively form an angle with a predetermined degree, the press portion presses the ear hook of the optical films on the border of the plastic frame.

Wherein the predetermined degrees of the angle is of a range between 80 and 90 degrees.

Wherein the border of the plastic frame comprises a positioning pillar, the ear hook comprises a positioning hole, a second side of the press portion comprises a semicircle through hole, the connection portion comprises a connecting through hole, the positioning hole and the semicircle through hole engages with the positioning pillar in turn, and the connecting through hole clasps with the hook.

Wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

Wherein the press portion further comprises a third side and a fourth side respectively extending outward to form a first flat portion and a second flat portion, and a recess is formed between the second side and a bottom surface of the press portion.

Wherein the border of the plastic frame further comprises a blind hole, the ear hook comprises a positioning hole, the second side of the press portion comprises a flange, the connection portion comprises a connecting through hole, and wherein the flange passes through the positioning hole and then inserted into the blind hole, and the connecting through hole engages with the hook.

Wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

Wherein the snap-fit is made by metallic material.

Wherein the snap-fit is made by plastic material.

In another aspect, a liquid crystal display includes: a display panel and a backlight module, the display panel is arranged corresponding to the backlight module, the backlight module supplies light source to the display module, wherein the backlight module comprises a plurality of optical films, a plastic frame, a light guiding plate, a back frame, and a plurality of snap-fits, the optical films are disposed above the plastic frame, the plastic frame assembled with the back frame so as to fix the light guiding plate within the back frame, the snap-fits press the optical films and clasp with the hooks on a sidewall of the back frame so as to fix the optical film, and the snap-fit comprises a press portion and a connection portion extending from a first side of the press portion, the connection portion and the press portion cooperatively form an angle with a predetermined degree, the press portion presses the ear hook of the optical films on the border of the plastic frame.

DETAILED DESCRIPTION OF THE EMBODIMENTS

Embodiments of the invention will now be described more fully hereinafter with reference to the accompanying drawings, in which embodiments of the invention are shown.

Figure 1:
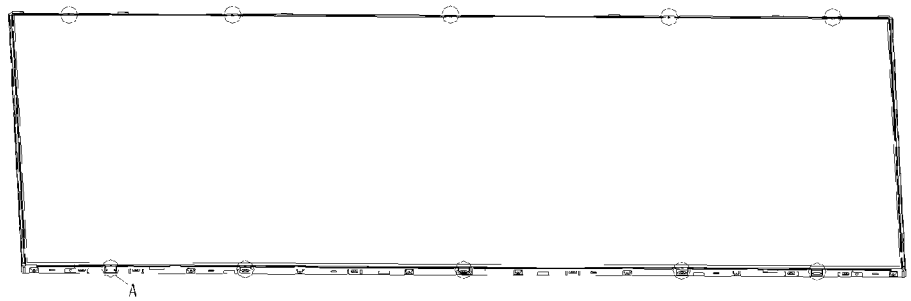
FIG. 1 is a schematic view of a backlight module in accordance with a first embodiment.
Figure 2:
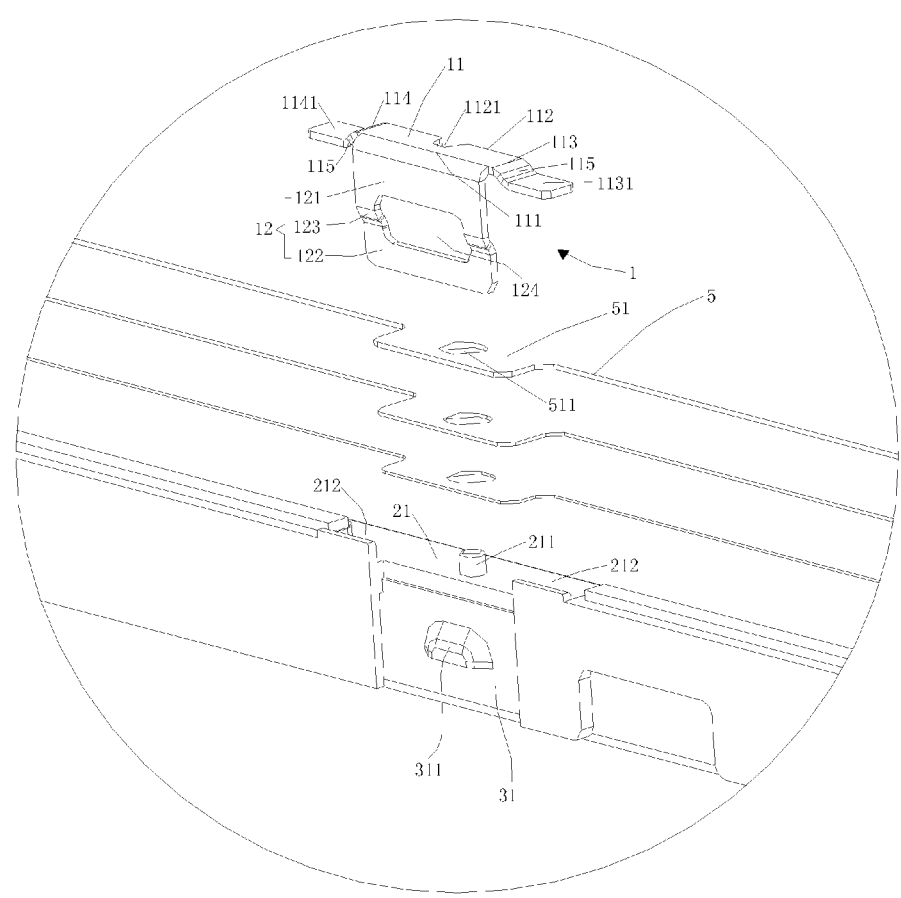
FIG. 2 is an exploded view of the portion indicated by symbol "A" in FIG. 1.
Figure 3:
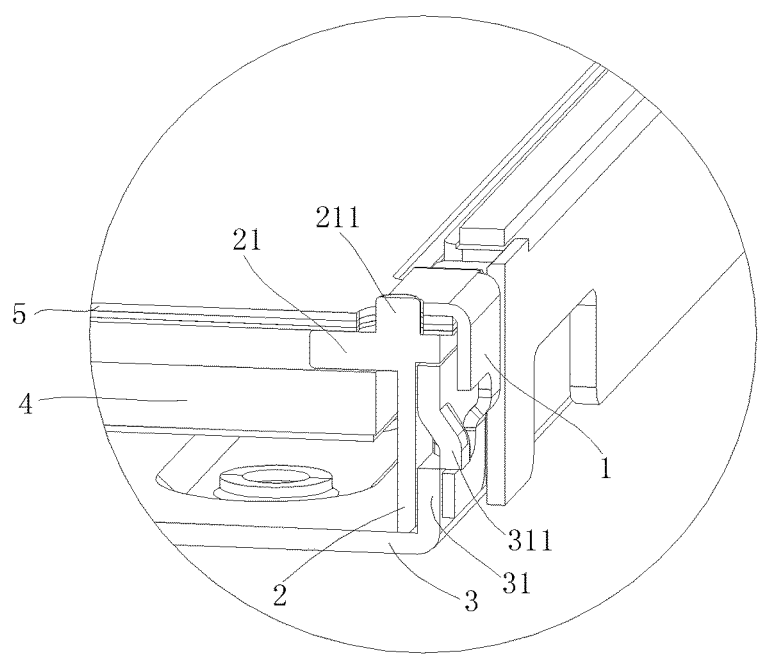
FIG. 3 is an enlarged view of the portion indicated by symbol "A" in FIG. 1.

FIG. 1 is a schematic view of a backlight module in accordance with a first embodiment. FIG. 2 is an exploded view of the portion indicated by symbol "A" in FIG. 1. FIG. 3 is an enlarged view of the portion indicated by symbol "A" in FIG. 1. Referring to FIGS. 1, 2 and 3, the backlight module includes a plurality of snap-fits 1, a plastic frame 2, a back frame 3, a light guiding plate 4, and a plurality of optical film 5. The edge of each of the optical film 5 includes an ear hook 51 having a positioning hole 511. The plastic frame 2 includes a border 21 with a positioning pillar 211. A sidewall 31 of the back frame 3 includes a hook 311.

Each snap-fit 1 includes a press portion 11 and a connection portion 12 extending from a first side 111 of the press portion 11. The connection portion 12 and the press portion 11 cooperatively form an angle with a predetermined degree. A second side 112 of the press portion 11 includes a semicircle through hole 1121. The connection portion 12 includes a connecting through hole 124.

When assembling the backlight module, the light guiding plate 4 is disposed within the back frame 3, and the plastic frame 2 assembled with the back frame 3 so as to fix the light guiding plate 4 within the back frame 3. The plurality of optical film 5 are disposed above the plastic frame 2 in turn such that the positioning hole 511 of the ear hook 51 of each of the optical film 5 engages with the positioning pillar 211 of the border 21 of the plastic frame 2. The semicircle through hole 1121 of the press portion 11 of each of the snap-fit 1 engages with the positioning pillar 211 of the border 21 of the plastic frame 2. In addition, the connecting through hole 124 of the connection portion 12 of the snap-fit 1 clasps with the hook 311 of the sidewall of the back frame 3. In this way, the plurality of optical film 5 is fixed. It is to be noted that the number and the location of the snap-fit 1 are not limited to the above disclosure. For example, the snap-fits 1 may be arranged on two lateral sides.

In order to strengthen the connection between the connection portion 12 and the hook 311, the predetermined degrees of the angle between the connection portion 12 and the press portion 11 may be, but not limited to, 80, 85 or 90 degrees.

In order to stably fix the plurality of optical film 5, the press portion 11 further includes a third side 113 and a fourth side 114 respectively extending outward to form a first flat portion 1131 and a second flat portion 1141. The third side 113 of the press portion 11 connects with the first flat portion 1131 by a bending portion 115. The fourth side 114 of the press portion 11 connects with the second flat portion 1141 by another bending portion 115. The first flat portion 1131 and the second flat portion 1141 are on the same plane, and the plane is parallel to the press portion 11. It is to be noted that the gap between the press portion 11 and the first flat portion 1131, the second flat portion 1141 equals to the thickness of the stacked optical films 5. The length of the press portion 11 equals to the length of the ear hook 51 such that the optical films 5 are received in the space formed by the press portion 11, the first flat portion 1131 and the second flat portion 1141. In addition, when the optical film 5 is pressed, the first flat portion 1131 and the second flat portion 1141 press corresponding receiving slots 212 arranged on the border 21.

In addition, the connection portion 12 includes a first connection portion 121 and a second connection portion 122. The first connection portion 121 and the second connection portion 122 are connected by a bending portion 123. The first connection portion 121, the second connection portion 122 and the bending portion 123 are interconnected so as to form the connecting through hole 124. The first connection portion 121 is parallel to the second connection portion 122, and the first connection portion 121 is spaced apart from the second connection portion 122 for a distance.

In this way, the connecting through hole 124 may be properly engaged with the hook 311 of the back frame 3.

It is to be noted that the snap-fit 1 may be made by metallic material, such as SECC, SGCC, or AL5052. In other embodiments, the snap-fit 1 may be made by plastic material, such as PET, PBT, PC, or ABS.

Figure 4:
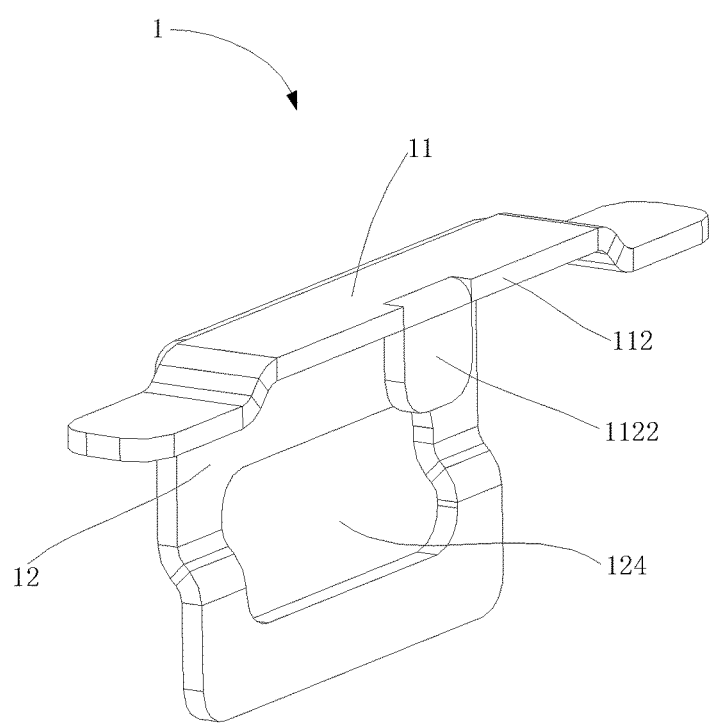
FIG. 4 is a schematic view of the snap-fit in accordance with a second embodiment.
Figure 5:
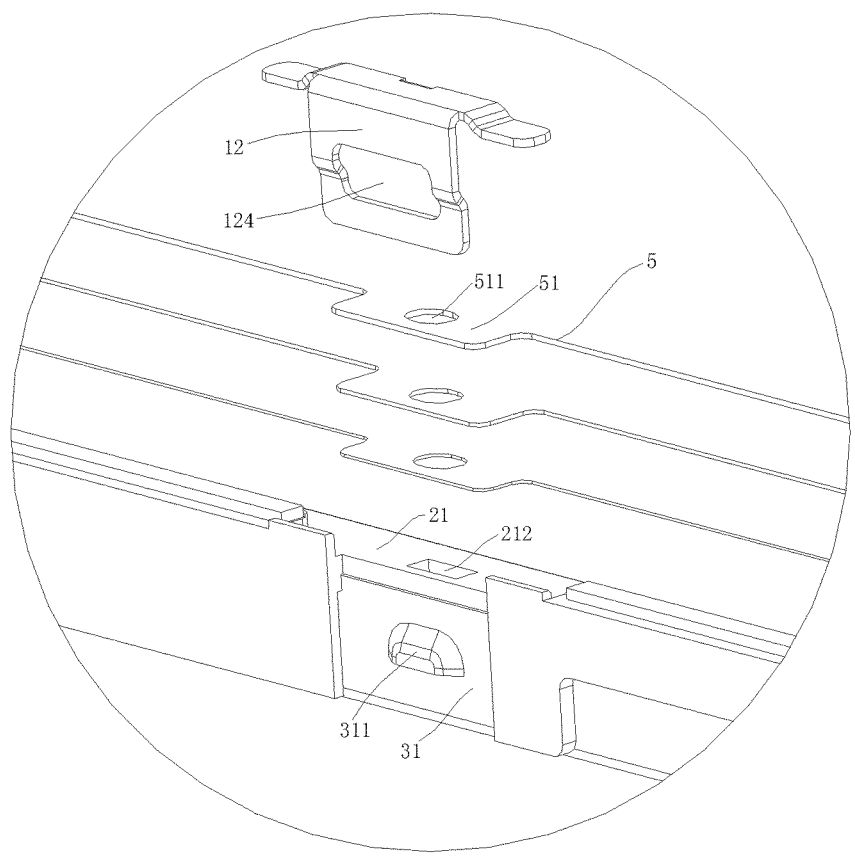
FIG. 5 is an exploded view of the backlight module in accordance with the second embodiment.

FIG. 4 is a schematic view showing the structure of the snap-fit in accordance with a second embodiment. FIG. 5 is an exploded view of the backlight module in accordance with the second embodiment. In the embodiment, the second side 112 of the press portion 11 of the snap-fit 1 includes a flange 1122. The border 21 includes a blind hole 212. When assembling the backlight module, the plurality of optical films 5 is disposed above the plastic frame 2. The positioning hole 511 of the ear hook 51 of each of the optical film 5 aligns with the blind hole 212 of the border 21 of the plastic frame 2. The flange 1122 of the press portion 11 of the snap-fit 1 passes through the positioning hole 511 and then inserted into the blind hole 212. In addition, the connecting through hole 124 of the connection portion 12 engages with the hook 311 of the sidewall 31 so as to fix the optical films 5.

Figure 6:
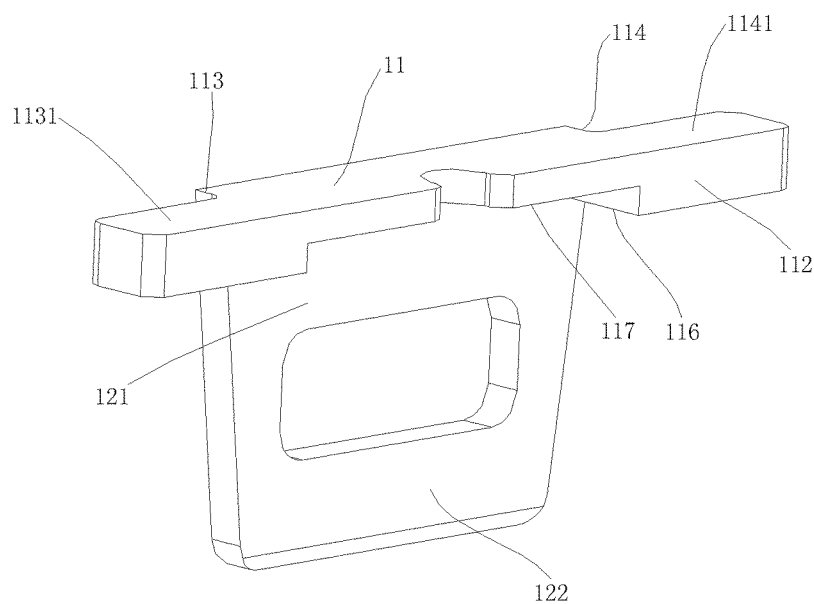
FIG. 6 is a schematic view showing the structure of the snap-fit in accordance with a third embodiment.

FIG. 6 is a schematic view of the snap-fit in accordance with a third embodiment. In the embodiment, the first flat portion 1131, the second flat portion 1141, and the press portion 11 are on the same plane. The first connection portion 121 and the second connection portion 122 are on the same plane. A recess 117 is formed between the second side 112 and a bottom surface 116 of the press portion 11. The dimension of the recess 117 is the same with the ear hook 51 of the optical film 5 such that the ear hook 51 may be received within the recess 117.

In one embodiment, a liquid crystal display includes the above backlight module for providing light sources such that the liquid crystal display can display images.

In view of the above, the snap-fit, the backlight module, and the liquid crystal display can achieve a narrow bezel design. Furthermore, the optical films are stably fixed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A snap-fit for fixing optical films, each of the optical films comprises at least one ear hook arranged above a border of a plastic frame, the plastic frame is assembled with a back frame so as to fix a light guiding plate within the back frame, the snap-fit comprising:
    a press portion and a connection portion extending from a first side of the press portion, the connection portion and the press portion cooperatively form an angle with a predetermined degree, the press portion presses the ear hook of the optical films on the border of the plastic frame, and the connection portion clasps with the hook of a sidewall of the back frame; and
    wherein the border of the plastic frame comprises a positioning pillar, the ear hook comprises a positioning hole, a second side of the press portion comprises a semicircle through hole, the connection portion comprises a connecting through hole, the positioning hole and the semicircle through hole engages with the positioning pillar in turn, and the connecting through hole clasps with the hook.

2. The snap-fit as claimed in claim 1, wherein the predetermined degree of the angle is of a range between 80 and 90 degrees.

3. The snap-fit as claimed in claim 1, wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

4. The snap-fit as claimed in claim 1, wherein the press portion further comprises a third side and a fourth side respectively extending outward to form a first flat portion and a second flat portion, and a recess is formed between the second side and a bottom surface of the press portion.

5. The snap-fit as claimed in claim 1, wherein the border of the plastic frame further comprises a blind hole, the ear hook comprises a positioning hole, the second side of the press portion comprises a flange, the connection portion comprises a connecting through hole, and wherein the flange passes through the positioning hole and then inserted into the blind hole, and the connecting through hole engages with the hook.

6. The snap-fit as claimed in claim 5, wherein the connection portion comprises a first connection portion and a second connection portion, the first connection portion and the second connection portion are connected by a bending portion, the first connection portion, the second connection portion and the bending portion are interconnected so as to form the connecting through hole, the press portion further comprises a third side and a fourth side respectively extending outward to form a first flat portion and a second flat portion, the third side and the fourth side of the press portion respectively connects with the first flat portion and the second flat portion by two bending portions.

7. The snap-fit as claimed in claim 1, wherein the snap-fit is made by metallic material.

8. The snap-fit as claimed in claim 1, wherein the snap-fit is made by plastic material.

* * * * *